(No Model.)
V. DOANE, Jr.
LOCKING DEVICE FOR STOVE PIPE DAMPERS.
No. 387,215. Patented Aug. 7, 1888.
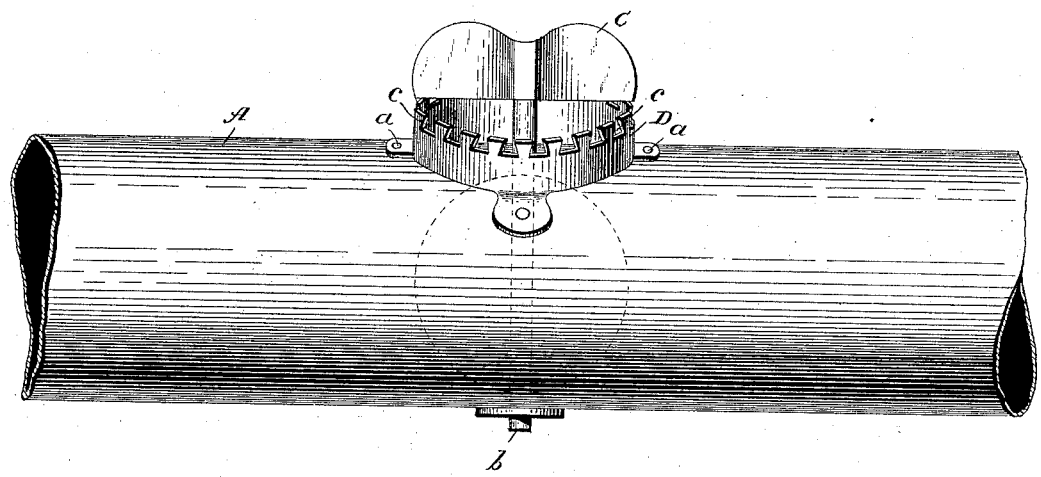
Witnesses
Edwin L. Bradford,
Frank Dorian.
Inventor,
Valentine Doane Jr.
By his Attorney in fact
Chas. E. Barber.

UNITED STATES PATENT OFFICE.

VALENTINE DOANE, JR., OF HARWICH, MASSACHUSETTS, ASSIGNOR TO FRED V. DOANE, OF SAME PLACE.

LOCKING DEVICE FOR STOVE-PIPE DAMPERS.

SPECIFICATION forming part of Letters Patent No. 387,215, dated August 7, 1888.

Application filed January 10, 1887. Serial No. 223,980. (No model.)

*To all whom it may concern:*

Be it known that I, VALENTINE DOANE, Jr., a citizen of the United States, residing at Harwich, in the county of Barnstable and State of Massachusetts, have invented a new and useful Improvement in Locking Devices for Stove-Pipe Dampers, of which the following is so full, clear, and exact a description as will enable others skilled in the art to which my invention appertains to make and use the same, reference being had to the accompanying drawings, in which the figure is a perspective of a joint of stove-pipe, showing my improved locking device in position on the damper.

The object of my invention is to prevent accident, loss of life, and injury to health, which is so frequently caused by the escape of gas from stoves in rooms which are occupied as sleeping-rooms, and which are also occupied for various other purposes, and in which such accidents are frequently occurring with results which are fatal. Various instances might be cited in which children have met their death on account of the accidental turning of the damper in the pipe by the pressure of gases or by a draft. In other instances even adults have gone to sleep in apartments where coal-stoves were used, and the damper has been accidentally turned, with results which have been disastrous. These defects are remedied and these disastrous consequences avoided by the use of a device constructed as follows:

A joint of ordinary pipe, as A, is provided with a damper, B, which is arranged vertically within the pipe, and which is constructed of metal, and the diameter of which is somewhat less than the diameter of the interior of the pipe. The pipe is perforated in the usual manner, and a rod or projection, b, extends through the perforation in one side of the pipe, at the bottom, while a similar projection extends through the opposite perforation in the pipe, and on the outer end of this projection I provide a rigid handle, C. Around the opening at this side of the pipe I provide a locking-catch, D, which is made curved to correspond to the contour of the outside of the pipe, and which is secured to the pipe by suitable rivets or bolts, a. The upper face of this locking-catch is provided with recesses or notches, which are formed by corrugations on the locking-catch, as c c. These recesses or openings are larger at the bottom than at the top, and their edges incline toward the pipe and obliquely away from the opening out of the recesses. This prevents any accidental displacement of the thumb-piece or handle on the damper, and the damper is held by means of the recesses and its own gravity in any desired adjusted position at any angle to the line of the interior of the pipe.

The operation of the device will not in any way be affected by varying degrees of heat or cold, and a device constructed on this plan will be practically free from liability to accidental displacement from any cause whatever. The difference between the diameter of the damper and the inner diameter of the interior of the stove-pipe will be sufficient to permit of the requisite amount of play in the damper to facilitate its ready and easy adjustment at any desired angle or position in the pipe.

Having now described my invention, what I desire to secure by Letters Patent, and what I therefore claim, is—

In a locking device for dampers in stove-pipes, the combination of the stove-pipe provided with a locking-catch having tapered recesses or openings smallest at their open ends to prevent slipping, as described, with a damper whose diameter is less than that of the pipe, having a stationary handle for engagement within the recesses in the locking-catch, said damper being held at any desired angle to the line of the pipe by the locking-catch and by its own gravity, substantially as and for the purposes specified.

In testimony that I claim the above as my invention I hereunto set my hand and affix my seal in the presence of two subscribing witnesses.

VALENTINE DOANE, JR. [L. S.]

Witnesses:
N. SUMNER MYRICK,
GEORGE F. MURPHY.